Sept. 6, 1938.     E. C. CHANDLER     2,129,564

WEIGHING FORK

Filed June 1, 1937

Inventor

Edwin C. Chandler

By Clarence A. O'Brien

Hyman Berman

Attorneys

Patented Sept. 6, 1938

2,129,564

UNITED STATES PATENT OFFICE 2,129,564

WEIGHING FORK

Edwin C. Chandler, Norwich, Vt.

Application June 1, 1937, Serial No. 145,881

2 Claims. (Cl. 265—66)

This invention relates to a weighing fork, the general object of the invention being to provide a simple means whereby each load picked up by the fork will be weighed by a weighing device associated with the handle so that the user of the fork can readily see how much material he is taking up with the fork.

This invention also consists in certain other features of construction and in the combination and arrangement of several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1:
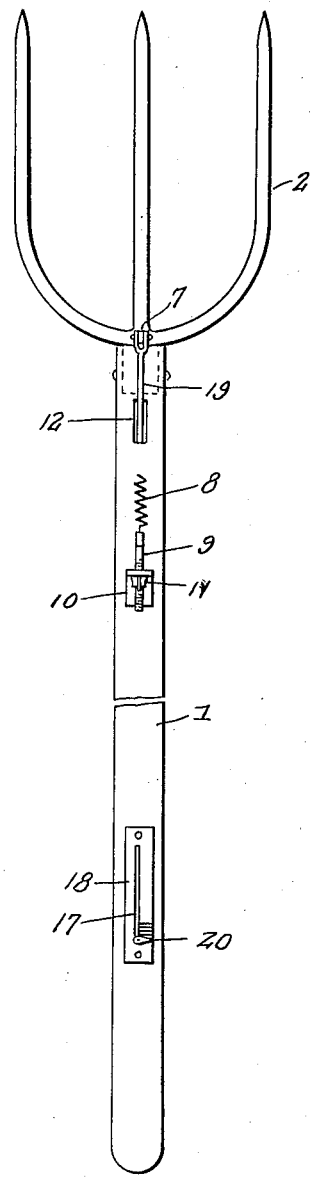
Figure 1 is a front view of the fork.
Figure 2:
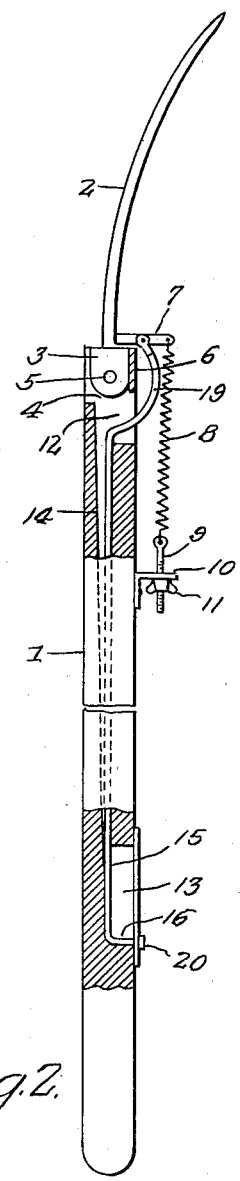
Figure 2 is a side view with parts in sections.

In this drawing the handle of the fork is shown at 1 and the pronged head is shown at 2, the head being provided with a lug 3 which fits in a socket 4 in the end of the handle and a pivot pin 5 passes through the lug and the handle to pivotally connect the head with the handle. The socket opens out through the end of the handle and through the rear end portion so that the lug can swing rearwardly or downwardly, a wall forming part 6 above the socket limiting upward movement and acting as a stop for the head. The lug is rounded so as to permit the head to swing downwardly without interference from the wall 6. A projection 7 extends forwardly from the inner end of the head and has one end of a spring 8 connected therewith, the other end of the spring being connected to a bolt 9 which passes through a bracket 10 on the handle, a thumb nut 11 being threaded on the bolt and abutting the bracket for adjusting the tension of the spring. A recess 12 is formed in the handle and communicates with the socket and opens out through a front part of the handle and a second recess 13 is formed in the handle and opens out through the front part thereof and this recess 13 is located adjacent the free end of the handle. A bore 14 connects the two recesses together and a rod 15 is slidably arranged in the bore and has one end bent at right angles, as shown at 16, and this end is located in the recess 13 and extends beyond the same and through a slot 17 in a scale plate 18 which is fastened to the handle and covers the recess 13. The other end of the rod is curved as shown at 19 and passes through the recess 12 over the wall 6 and is pivoted to the projection 7. A pointer 20 is connected to the part 16 and slides over the scale plate to cooperate with the graduations on the plate.

As will be seen when a load of material is picked up by the prongs the weight of this material will overbalance the spring 8 so that the head of the fork will swing downwardly and thus pull upon the rod 15 so that the pointer 20 will move over the scale plate and thus indicate the weight of the load carried by the head. As the scale plate is located where it can be readily observed by the user of the fork such user can readily observe the weight of the load picked up by the fork. When the fork is freed of the load the spring 8 will return the head to normal position.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. An implement of the class described comprising a handle and a head part, means for pivotally connecting the head part with one end of the handle, means for limiting upward movement of the head part, a projection on the head part, a rod slidably arranged in the handle and having one end projecting therefrom and pivoted to the projection, a scale plate on the handle having a slot therein, a projection on the rod extending through the slot and having a pointer thereon for cooperating with the scale on the plate and a spring having one end adjustably connected to the handle and its other end to the projection on the head part for holding the head part at the upward limit of its movement.

2. An implement of the class described comprising a handle having a socket at one end opening out through said end and through the rear portion of said end, said socket leaving a wall at the front portion of the said end forming a stop, a head part having a lug thereon pivoted in the socket and having a portion engaging the stop for limiting upward movement of the head part, a projection on the head part, a bracket on the handle, a bolt passing through the bracket, an adjusting nut on the bolt, a spring connecting the bolt with the projection, said handle having recesses therein opening out through the front thereof, one recess being located near the socketed end of the handle, and a bore connecting the recesses, a rod sliding in the bore and having a curved end passing through the last-mentioned recess and pivoted to the projection, the other end of the rod being located in the second recess and bent to project from the recess and a scale plate connected with the handle and covering the recess and having a slot therein through which the bent end of the rod passes.

EDWIN C. CHANDLER.